US010843388B2

(12) United States Patent
Baranowski et al.

(10) Patent No.: US 10,843,388 B2
(45) Date of Patent: Nov. 24, 2020

(54) TAILGATE FOR A MOTOR VEHICLE, AND METHOD FOR PRODUCING SUCH A TAILGATE

(71) Applicant: FORD GLOBAL TECHNOLOGIES, LLC, Dearborn, MI (US)

(72) Inventors: Thomas Baranowski, Würselen (DE); Maik Broda, Würselen (DE); Markus Franzen, Stolberg (DE); Pascal Rebmann, Weilerswist (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 53 days.

(21) Appl. No.: 16/368,398

(22) Filed: Mar. 28, 2019

(65) Prior Publication Data
US 2019/0299759 A1    Oct. 3, 2019

(30) Foreign Application Priority Data
Mar. 28, 2018    (DE) ........................ 10 2018 204 732

(51) Int. Cl.
*B29C 45/00*    (2006.01)
*B29C 45/14*    (2006.01)
*B29L 31/30*    (2006.01)

(52) U.S. Cl.
CPC .... *B29C 45/0005* (2013.01); *B29C 45/14786* (2013.01); *B29L 2031/3014* (2013.01); *Y10T 29/49622* (2015.01)

(58) Field of Classification Search
CPC .......... B62D 25/10; B62D 29/04; B60J 5/107; B29C 45/0005; B29C 45/14786; B29K 2015/12; B29L 2031/3014; Y10T 29/49622
See application file for complete search history.

(56) References Cited

U.S. PATENT DOCUMENTS

| 2,859,936 | A | * | 11/1958 | Warnken ................. B29C 70/86 416/225 |
| 6,412,852 | B1 | | 7/2002 | Koa et al. |
| 6,464,289 | B2 | * | 10/2002 | Sigonneau ........ B29C 45/14778 296/193.09 |

(Continued)

FOREIGN PATENT DOCUMENTS

| JP | 2015030382 A | 2/2015 |
| JP | 2015093582 A | 5/2015 |

OTHER PUBLICATIONS

English Machine Translation of JP2015030382A dated Feb. 16, 2015.
English Machine Translation of JP2015093582A dated May 18, 2015.

*Primary Examiner* — Jason L Vaughan
(74) *Attorney, Agent, or Firm* — David Coppiellie; Carlson, Gaskey & Olds, P.C.

(57) ABSTRACT

A tailgate, for a motor vehicle, has a main body made from an injection-molded fiber-reinforced plastics material, and at least one fiber-reinforced plastics material tape that is disposed on the main body. In order for a tailgate having improved load transmission and load distribution properties to be provided, the tailgate has at least one additional component which is at least partially embedded in the main body and which has at least one connection portion around which a loop of the fiber-reinforced plastics material tape is guided.

6 Claims, 4 Drawing Sheets

(56) References Cited

U.S. PATENT DOCUMENTS

| | | | |
|---|---|---|---|
| 8,550,536 B2* | 10/2013 | Gachter | B60J 5/101 296/146.8 |
| 9,010,839 B2* | 4/2015 | Schijve | B60J 5/0422 296/146.6 |
| 9,272,606 B2 | 3/2016 | Schijve et al. | |
| 9,815,420 B2* | 11/2017 | Kim | B29C 45/14786 |
| 2009/0194902 A1* | 8/2009 | Lee | B29C 45/14786 264/211.12 |
| 2015/0044419 A1* | 2/2015 | Carson, Jr. | B29C 66/547 428/138 |
| 2017/0361781 A1* | 12/2017 | Khayat | B60J 5/107 |
| 2019/0184799 A1* | 6/2019 | Kerschbaum | B29C 45/14336 |

* cited by examiner

TAILGATE FOR A MOTOR VEHICLE, AND METHOD FOR PRODUCING SUCH A TAILGATE

TECHNICAL FIELD

This document relates to a tailgate for a motor vehicle, having a main body from an injection-molded fiber-reinforced plastics material, and at least one fiber-reinforced plastics material tape that is disposed on and/or in the main body. This document also relates to a method for producing a tailgate for a motor vehicle.

BACKGROUND

Conventional tailgates of motor vehicles are assemblies of complex construction of various components and materials, so as to mutually combine a diversity of construction features and functions. Said construction features or functions, respectively, include lights, brake lights, joints, a rear window, and the like, and moreover accident-relevant and safety-relevant mechanical properties. In particular, a tailgate must remain in the closed position thereof during an accident and after the accident, so as to meet statutory safety directives. Above all, the region around a tailgate lock that is disposed on the tailgate is critical since any breakage of the material in this region can lead to the tailgate lock being released from the tailgate such that the tailgate can move from the closed position thereof during or after an accident.

U.S. Pat. No. 8,550,536 B2 discloses a tailgate for a motor vehicle, having a partial support structure from a fiber-reinforced thermoplastic material and an integral main support structure having an encircling flexurally rigid frame which has an upper crossbeam, two lateral longitudinal beams, and at least one lower crossbeam. The main support structure is composed of a fiber-reinforced molding compound which has at least two impregnated integrated continuous-fiber tapes and which is connected to a rear window of the tailgate in a force-fitting manner such that said main support structure conjointly with the rear window forms a flexurally rigid structure. The continuous-fiber tapes in portions are integrated in the frame and have an arrangement that is vertical to the surface of the tailgate in that the continuous-fiber tapes are disposed so as to be vertical to the surface and/or so as to be vertically spaced apart from the surface. By way of the spatial shaping of the fiber-reinforced molding compound, the continuous fiber tapes are connected to one another as force-transmitting and reinforcing connection regions. The frame has crease-shaped reinforcements of the molding compound.

JP 2015 093 582 A2 discloses a vehicle door having an internal panel that is disposed on an internal side of the vehicle, an external panel that is disposed on an external side of the vehicle, and a motor vehicle license plate that is attached to a face of the external panel on the external side of the vehicle. The internal panel has a door glass opening which is provided in an upper portion and to which a door glass is attached. A panel portion is provided below the door glass opening. A plurality of beads bulge toward an internal side of the vehicle or to an external side of the vehicle. The motor vehicle license plate that is attached to the external panel is disposed such that said motor vehicle license plate, when viewed from the rear of the vehicle, overlaps a portion of the panel portion of the internal panel. The plurality of beads have a pair of upper oblique beads which in terms of the profile thereof run from positions on the panel portion which, when viewed from the rear of the vehicle, correspond to upper corners of the motor vehicle license plate, in an oblique upward manner toward an external side in the vehicle cross direction, and a pair of lower beads which in terms of the profile thereof run from positions on the panel portion which, when viewed from the rear of the vehicle, correspond to lower corners of the motor vehicle license plate, in an oblique downward manner toward an external side in the vehicle cross direction.

JP 2015 030 382 A discloses a rear-side door of plastics material, said rear-side door being provided on a rear-side opening of the vehicle body in such a manner that said rear-side door is capable of being opened and closed. The rear-side door has an external plate and an internal plate, each being produced from a shaped plastics material item which has an upper part which is provided with a window opening. The external plate and the internal plate in circumferential parts of said plates and in circumferential parts of the window opening are integrally connected to one another. An upper end part, which defines an upper side of the window opening by means of a hinge, is pivotably connected to an upper side of the rear-side opening of the vehicle body. The rear-side door furthermore has a locking mechanism which is attached to a lower end part of the internal plate so as to be capable of engaging with a closing bracket fastened to a lower side of the rear-side opening of the vehicle body and so as to be releasable from said closing bracket. An internal space is formed between the external plate and the internal plate. The rear-side door moreover has at least one element from the group of wire cable or wiring harness for connecting the upper end part to a main body part that is disposed below the window opening. Right and left sides of the window opening are in each case defined by pillar parts. A pair of ribs that extend in the longitudinal direction of at least one of the pillar parts is provided so as to project on an internal face of the at least one pillar part. The internal faces point toward the interior space of the internal plate. A passage for disposing the at least one element from the group of wire cable or wiring harness is defined between the pair of ribs. A reinforcing long fiber is insert-molded along the passage in a cross section of the internal plate.

U.S. Pat. No. 9,272,606 B2 discloses a side door for a vehicle. The side door has a structure having a plastics material shell which has a shell support beam which is positioned above a main body portion of the shell. The shell support beam has substantially unidirectional fiber-tape portions. The plastics material shell has an internal plastics material shell and an external plastics material shell.

U.S. Pat. No. 6,412,852 B1 discloses a water and sound attenuating barrier for positioning between the interior surface of a vehicle door exterior panel and the door interior trim panel. The barrier is formed of a sheet of semi-rigid material having an inner face and an outer face. A thick layer of sound attenuating material is bonded to the sheet inner face and pressure sensitive adhesive is applied upon the sheet outer face. The sheet and trim panel are fastened together with the layer against the trim panel and with the adhesive bearing face exposed, to form a unitary module. To assemble the module with the door panel, the module exposed face is pressed against the door panel interior surface for securing the adhesive on the sheet outer face thereto. Mechanical fasteners releasably secure the sheet and the trim panel together and, also, secure the trim panel to the door panel during the assembly.

SUMMARY

It is an object hereof to provide a tailgate having improved load-transmitting and load-distributing properties.

The object is achieved by a tailgate having a main body formed from an injection-molded fiber-reinforced plastics material, and at least one fiber-reinforced plastics material tape that is disposed on and/or in the main body. Proposed is a tailgate which has at least one additional component which is at least in part embedded in the main body and which has at least one connection portion around which a loop of the fiber-reinforced plastics material tape is guided.

It is to be pointed out that the features and measures set forth individually in the following description may be combined with one another in any desired technically meaningful way and disclose further configurations of the tailgate and the method of making a tailgate. The description, in particular in conjunction with the figures, characterizes and specifies the tailgate and the method of making a tailgate further.

The fiber-reinforced plastics material tape, while forming the loop, is wrapped around the connection portion of the additional component. In the event of the tailgate being impinged with tensile forces, or the main body of the tailgate being destroyed, respectively, because of an accident, the fiber-reinforced plastics material tape is thus coupled directly to the additional component in a force-transmitting manner A form-fit between the additional component and the main body is provided since the additional component is partially or completely embedded in the main body. On account thereof, the fiber-reinforced plastics material tape is anchored to the main body by means of the additional component. The additional component preferably serves for fastening at least one further vehicle component to the tailgate, and is disposed on such a portion of the tailgate which in the event of an accident is very heavily mechanically stressed and can break herein. The additional component herein can assume the function of a reinforcement component. It can moreover be guaranteed that the fiber-reinforced plastics material tape remains securely connected to the further vehicle component that is fastened to the additional component even in the event of the main body breaking in the region of the additional component.

The connection portion of the additional component can have at least one breakout, for example, which can be configured so as to be rectangular, for example, so as to be able to guide the fiber-reinforced plastics material tape through the breakout and around the connection portion without bulging said fiber-reinforced plastics material tape about the longitudinal central axis of the latter. The additional component can also have two or a plurality of corresponding connection portions, a loop of a single fiber-reinforced plastics material tape being in each case guided around said connection portions, or a loop of separate fiber-reinforced plastics material tapes being in each case guided around said connection portions. The tailgate can also have two or a plurality of corresponding additional components which are in each case connected to one or a plurality of fiber-reinforced plastics material tapes.

The main body from the injection-molded fiber-reinforced plastics material, on account of the fiber reinforcement thereof, is configured so as to be relatively breakage-proof and dimensionally stable. The main body is thus an injection molded component. The plastics material of the main body can have a thermoplastic or thermosetting plastics material component, for example. The plastics material can additionally contain a filler such as, for example, talc. The plastics material component of the plastics material can be produced from polypropylene, a polyamide, polyoxymethylene, a polycarbonate, or an acrylonitrile butadiene styrene copolymer, for example. The plastics material for the reinforcement thereof can contain short or long fibers. For the fiber reinforcement of the plastics material, the latter can contain short or long reinforcement fibers. For example, glass fibers, carbon fibers, aramid fibers, or other man-made or natural fibers, can be used for the fiber reinforcement. The fiber-reinforced plastics material can moreover be foamed by a physical or chemical foaming process, in order for the weight of the main body to be reduced.

The fiber-reinforced plastics material tape can be configured as a flat tape having reinforcement fibers that are aligned so as to be unidirectional in the longitudinal direction of the tape, or so as to be bidirectional or multidirectional. The fiber-reinforced plastics material tape can be constructed from two or more layers having dissimilar fiber alignments. The plastics material tape can comprise a polymer material in which the reinforcement fibers are at least partially embedded. The polymer material, in particular in terms of the melting temperature thereof, can be similar or identical to the plastics material component of the plastics material of the main body, such that the polymer material during injection molding of the main body can connect in a materially integral manner to the plastics material component of the plastics material of the main body. Any release of the fiber-reinforced plastics material tape from the main body is reliably prevented on account thereof. The reinforcement fibers of the plastics material tape can be, for example, glass fibers, carbon fibers, aramid fibers, or other man-made or natural fibers. The fiber-reinforced plastics material tape can be partially or completely disposed in the main body. Alternatively, the fiber-reinforced plastics material tape can be partially or completely disposed externally on the main body. The tailgate can also have two or more corresponding fiber-reinforced plastics material tapes.

For example, the tailgate can be partially produced from a fiber-reinforced thermosetting plastic, for example from a plate-shaped doughy molding compound (SMC, or sheet molding compound), from thermosetting plastic reactive resins and reinforcement fibers, or from a fiber-reinforced thermoplastic material. A weight reduction in comparison to conventional tailgates from metal can be achieved on account thereof. Moreover, costs can be saved and the assembly complexity can be reduced. The combination of the at least one fiber-reinforced plastics material tape with the additional component main body from the plastics material for configuring the tailgate enables the production of lightweight reinforced tailgates while using suitable plastics material processing methods such as, for example, an injection method or an insert-molding method, for example. Moreover, any unacceptable breakage of a non-fiber-reinforced tailgate can be prevented by the use of such reinforced tailgates in that specially configured additional components are utilized for additionally fixing the at least one fiber-reinforced plastics material tape. On account of the reinforcement of the main body of the tailgate being integrated in the production process of the main body, the mechanical requirements can be met by a tailored local reinforcement of the main body in highly stressed regions of the main body.

Advantageously, safety features may be potentially integrated in a lightweight tailgate of a motor vehicle in combination with adaptable reinforcement structures. Advantageously, contact corrosion between the tailgate and vehicle components that come into contact with said tailgate or are permanently connected to the latter is prevented.

The motor vehicle can be a passenger motor vehicle or a commercial vehicle, for example.

According to one advantageous embodiment the additional component is a fastening element to which a tailgate lock can be fastened. The stresses that arise on a tailgate in the region of the tailgate lock in the event of a rear-side accident are usually relatively high. Conventionally, this can lead to a breakage of the tailgate and to the tailgate lock being released from the tailgate such that the tailgate can move out of the closed position thereof during or after the accident, the latter having to be prevented. On account of the present design embodiment of the tailgate, the fiber-reinforced plastics material tape by way of the additional component is securely connected to the tailgate lock such that it can be reliably prevented that the tailgate lock is completely released from the tailgate during an accident. In the event of a respective accident situation, the fiber-reinforced plastics material tape, on account of the better mechanical properties thereof along the reinforcement fibers, serves as a link between the main body and the additional component, or the tailgate lock fastened to the latter, respectively.

According to one further advantageous design embodiment the additional component is at least partially produced from a metal, a metal alloy, or a plastics composite material.

The above object is furthermore achieved by a method comprising the following steps:
  attaching at least one additional component within an opened injection mold, said additional component having at least one connection portion;
  attaching at least one fiber-reinforced plastics material tape within the opened injection mold, wherein a loop of the fiber-reinforced plastics material tape is guided around the connection portion of the additional component;
  closing the injection mold; and
  configuring a main body by injecting a fiber-reinforced plastics material into the closed injection mold, the additional component and the fiber-reinforced plastics material tape being at least partially embedded in said main body.

The method is correspondingly associated with the advantages mentioned above with regard to the tailgate. In particular, the tailgate according to one of the abovementioned design embodiments or any combination of at least two of said design embodiments can be produced with one another by means of the method.

The injection-molding method used for producing the main body can additionally be used for integrating further functional components in the tailgate. A functional component can be, for example, a loudspeaker fastening, a joint, a door lock, an interior trim, an impact protection installation, a cable duct, a clip, a handle, a window, a window-guiding system, a rear spoiler, a wiper installation, a rear light, or the like.

The production of the tailgate offers a higher degree of freedom in terms of design, on account of which the tailgate can be adapted individually to the respective requirements. Production costs can moreover be reduced, in particular since the tailgate is produced while using few individual components and the majority of the tailgate, specifically the main body, is configured so as to be monolithic. Tailgates of lighter weights can in particular be produced by the method. Additional cost savings can be implemented on account of the functional integration of the components of the tailgate and on account of the reduction in terms of the complexity and time associated with the production of the tailgate. The method can moreover be combined with other technologies such as, for example, with multi-component injection-molding tools.

A desired positioning of the fiber-reinforced plastics material tape within the injection mold can be ensured on account of the attachment and the fixed positioning of the additional component within the opened injection mold, and on account of the disposal of the fiber-reinforced plastics material tape on the additional component.

According to one advantageous design embodiment at least one tailgate seal is incorporated in the opened injection mold prior to the injection mold being closed. This renders superfluous any conventional subsequent attachment of a tailgate seal to the main body, thus reducing the assembly complexity. The tailgate seal is partially insert-molded with the fiber-reinforced plastics material of the main body, so as to establish a form-fit between the tailgate seal and the main body.

One further advantageous design embodiment provides that the injection of the fiber-reinforced plastics material into the closed injection mold is performed while using a bi-component injection molding method, wherein the fiber-reinforced plastics material is a first component of said method, and an elastomeric material for configuring a tailgate seal is a second component of the method. The tailgate seal can thereafter be produced directly on the main body while the latter is being produced. The second component can be, for example, a thermoplastic elastomer.

According to one further advantageous design embodiment, at least one insulation component for thermal and/or acoustic insulation is incorporated in the opened injection mold prior to the injection mold being closed. The insulation component may be at least partially embedded in the main body by injecting the fiber-reinforced plastics material into the closed injection mold. On account thereof, the tailgate can be refined in terms of an improved thermal and/or acoustic insulation of a vehicle passenger cabin. The insulation can be formed from a textile material, for example.

BRIEF DESCRIPTION OF THE DRAWING FIGURES

Further advantageous design embodiments are disclosed in the dependent claims and in the following description of the figures. In the figures:

BRIEF DESCRIPTION OF THE DRAWING FIGURES

In the different figures, identical parts are always provided with the same reference signs, and so said parts are generally also described only once.

Figure 1:
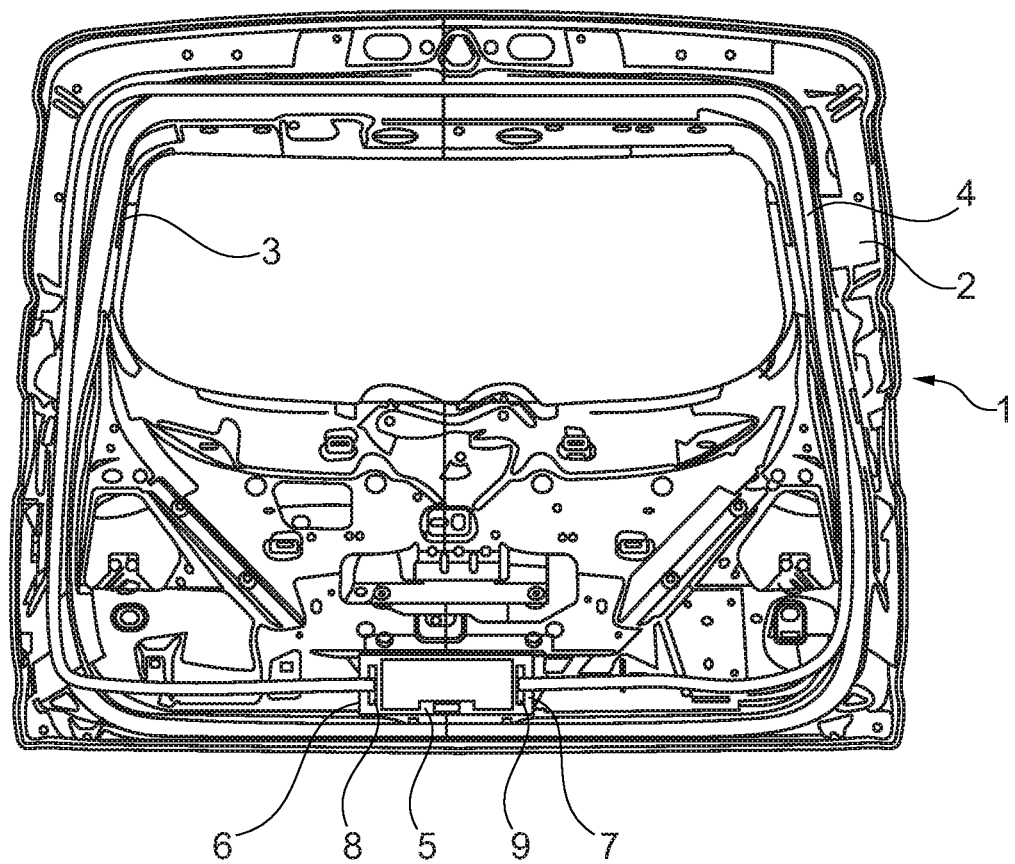
FIG. 1 shows a schematic illustration of an exemplary embodiment of a tailgate.

FIG. 1 shows a schematic illustration of an exemplary embodiment of a tailgate 1 for a motor vehicle (not shown). The tailgate 1 has a main body 2 made from an injection-molded fiber-reinforced material. A window opening 3 for receiving a rear window (not shown) is configured on the main body 2.

The tailgate 1 moreover has a fiber-reinforced plastics material tape 4 that is disposed on and/or in the main body 2. The fiber-reinforced plastics material tape 4 is disposed so as to encircle the window opening 3 and to be in an encircling peripheral region of the main body 2.

The tailgate 1 furthermore has an additional component 5 which is at least in part embedded in the main body 2 and which serves for fastening a tailgate lock (not shown) to the tailgate 1, and which has two laterally disposed connection portions 6 and 7 around which in each case a loop of the fiber-reinforced plastics material tape 4 is guided. To this end, two rectangular openings or breakouts 8 and 9 through which the fiber-reinforced plastics material tape 4 is guided are configured on the additional component 5. The additional component 5 is thus a fastening component to which the tailgate lock can be fastened. The additional component 5 is partially or completely produced from a metal, a metal alloy, or a fiber-composite plastics material.

Figure 2:
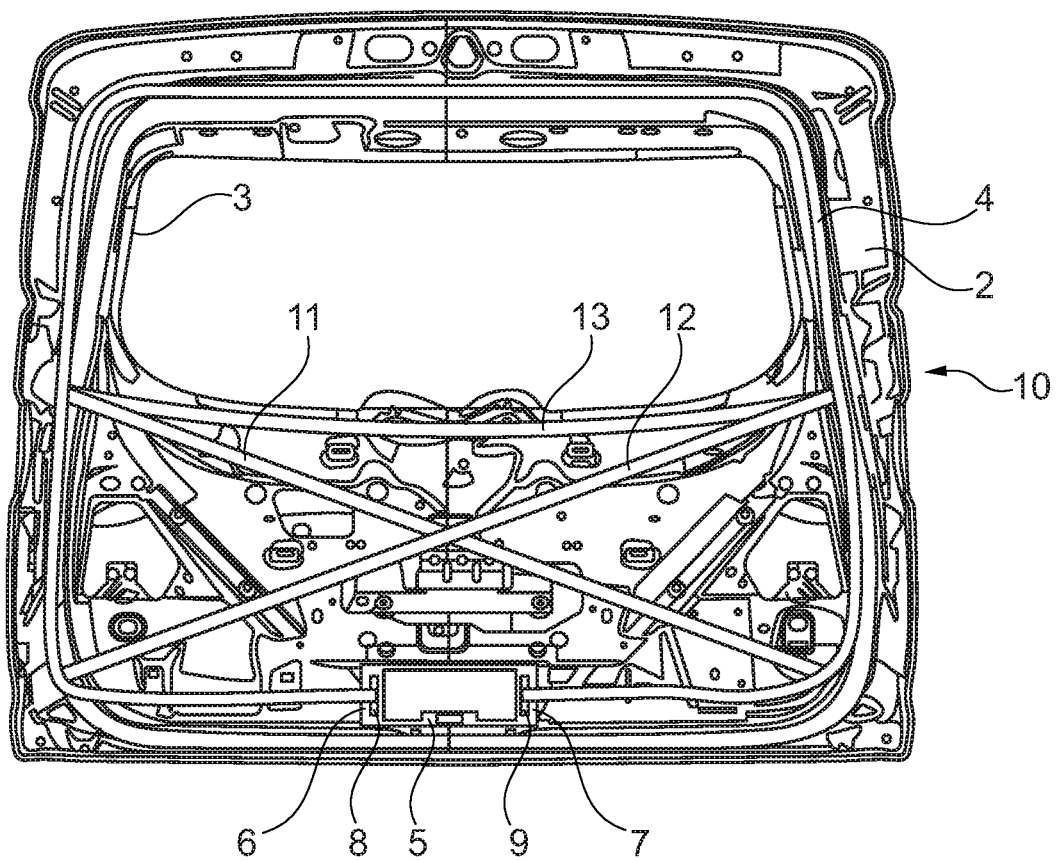
FIG. 2 shows a schematic illustration of a further exemplary embodiment of a tailgate.

FIG. 2 shows a schematic illustration of a further exemplary embodiment of a tailgate 10. The tailgate 10 differs from the exemplary embodiment shown in FIG. 1 in that three additional fiber-reinforced plastics material tapes 11, 12 and 13 are present. The two tapes 11 and 12 run in an inclined manner, intersect one another, and at the end side are connected to the plastic materials tape 4. The plastics material tape 13 runs in a horizontal manner and at the end side is connected to the plastics material tape 4. To avoid repetitions, reference is made in other respects to the above description of FIG. 1.

Figure 3:
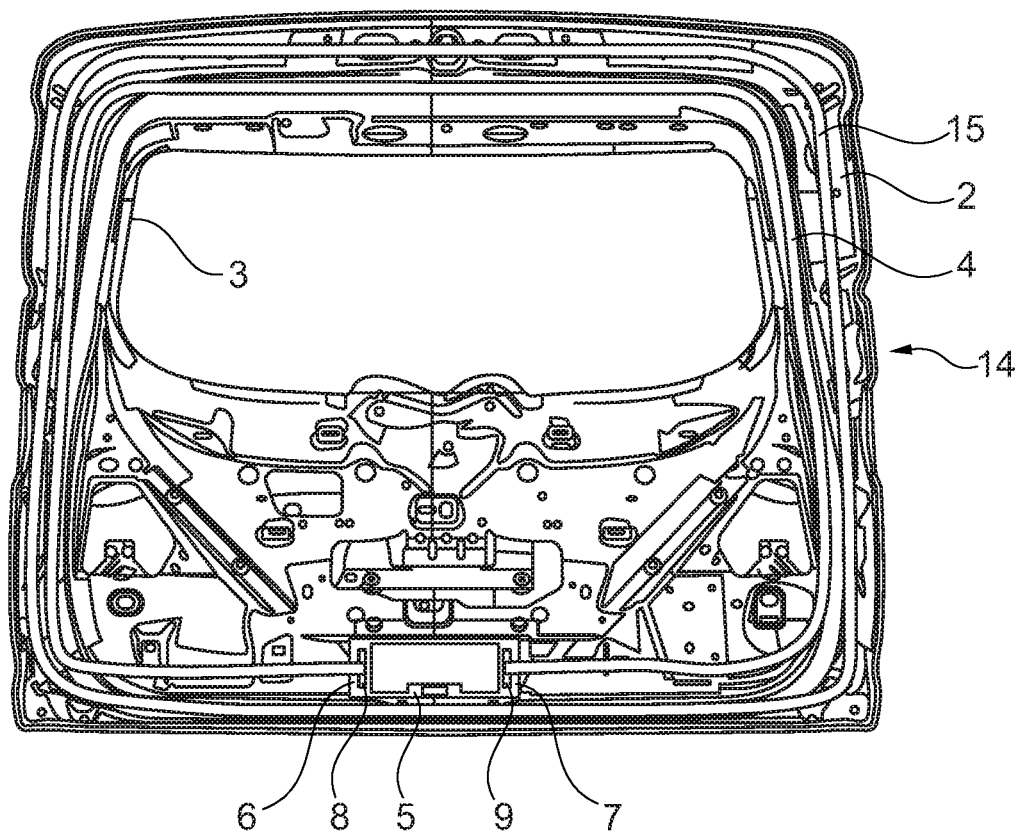
FIG. 3 shows a schematic illustration of a further exemplary embodiment of a tailgate.

FIG. 3 shows a schematic illustration of a further exemplary embodiment of a tailgate 14. The tailgate 14 differs from the exemplary embodiment shown in FIG. 1 in that a tailgate seal 15 is additionally disposed on the main body 2. The tailgate seal 15 can be produced conjointly with the main body in the production of the latter while using a bi-component injection molding method, or be prefabricated and be partially insert-molded with the fiber-reinforced plastics material of the main body. To avoid repetitions, reference is made in other respects to the above description of FIG. 1.

Figure 4:
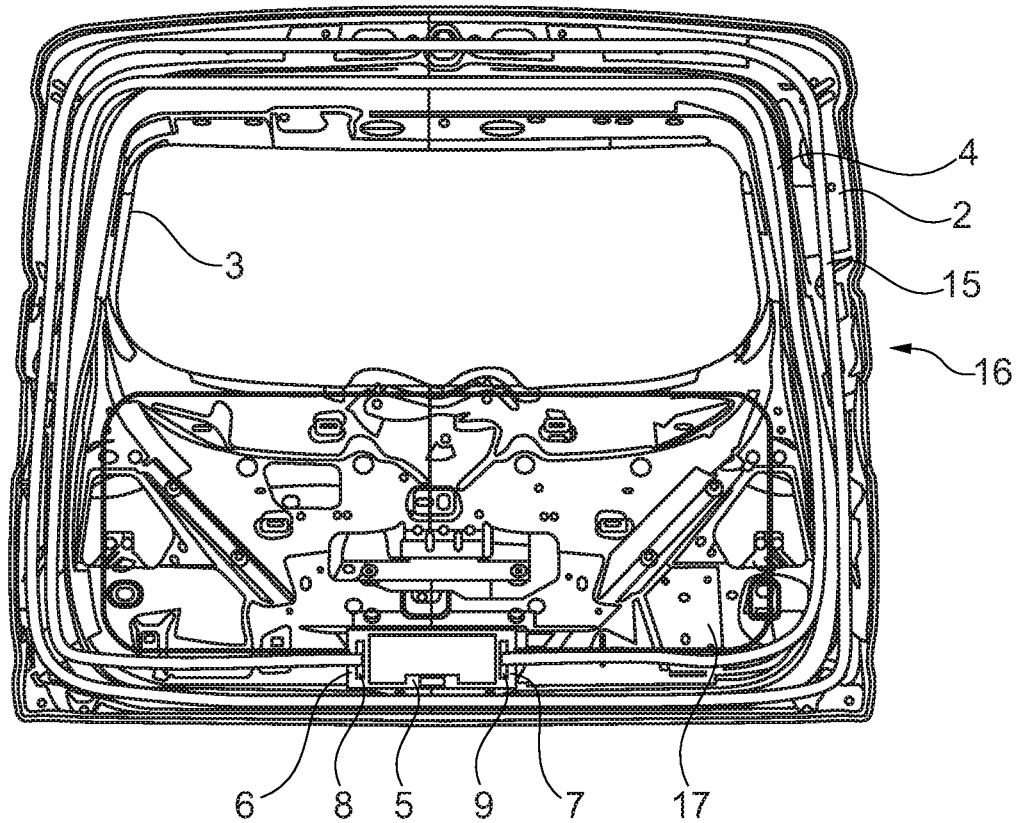
FIG. 4 shows a schematic illustration of a further exemplary embodiment of a tailgate.

FIG. 4 shows a schematic illustration of a further exemplary embodiment of a tailgate 16. The tailgate 16 differs from the exemplary embodiment shown in FIG. 3 in that an insulation component 17 for thermal and/or acoustic insulation is additionally disposed on the tailgate 16. The insulation component is at least partially embedded in the main body 2. To avoid repetitions, reference is made in other respects to the above descriptions of FIGS. 1-3.

What is claimed:

1. A method for producing a main body of a tailgate for a motor vehicle, wherein the method comprises steps of:
    attaching at least one additional component within an opened injection mold, said at least one additional component having at least one connection portion;
    attaching at least one fiber-reinforced plastics material tape within the opened injection mold, wherein a loop of the fiber-reinforced plastics material tape is guided around the at least one connection portion of the additional component;
    closing the injection mold;
    configuring the main body by injecting a fiber-reinforced plastics material into the closed injection mold, the at least one additional component and the fiber-reinforced plastics material tape being at least partially embedded in said main body; and
    incorporating at least one tailgate seal in the opened injection mold prior to the injection mold being closed.

2. The method as claimed in claim 1, wherein said injecting of the fiber-reinforced plastics material into the closed injection mold is performed using a bi-component injection molding method, wherein the fiber-reinforced plastics material is a first component of said method, and an elastomeric material for configuring a tailgate seal is a second component of the method.

3. The method as claimed in claim 2, further including incorporating at least one insulation component in the opened injection mold prior to the injection mold being closed, said at least one insulation component being at least partially embedded in the main body by injecting the fiber-reinforced plastics material into the closed injection mold.

4. The method as claimed in claim 1, further including incorporating at least one insulation component in the opened injection mold prior to the injection mold being closed, said at least one insulation component being at least partially embedded in the main body by injecting the fiber-reinforced plastics material into the closed injection mold.

5. A method for producing a main body of a tailgate for a motor vehicle, wherein the method comprises steps of:
    attaching at least one additional component within an opened injection mold, said at least one additional component having at least one connection portion;
    attaching at least one fiber-reinforced plastics material tape within the opened injection mold, wherein a loop of the fiber-reinforced plastics material tape is guided around the at least one connection portion of the additional component;
    closing the injection mold;
    configuring the main body by injecting a fiber-reinforced plastics material into the closed injection mold, the at least one additional component and the fiber-reinforced plastics material tape being at least partially embedded in said main body; and
    incorporating at least one insulation component in the opened injection mold prior to the injection mold being closed, said at least one insulation component being at least partially embedded in the main body by injecting the fiber-reinforced plastics material into the closed injection mold.

6. The method as claimed in claim 5, wherein said injecting of the fiber-reinforced plastics material into the closed injection mold is performed using a bi-component injection molding method, wherein the fiber-reinforced plastics material is a first component of said method, and an elastomeric material for configuring a tailgate seal is a second component of the method.

* * * * *